July 23, 1940.  P. L. DONOVAN  2,208,835
HARROW TOOTH AND SUPPORTING BAR THEREFOR
Original Filed May 10, 1937
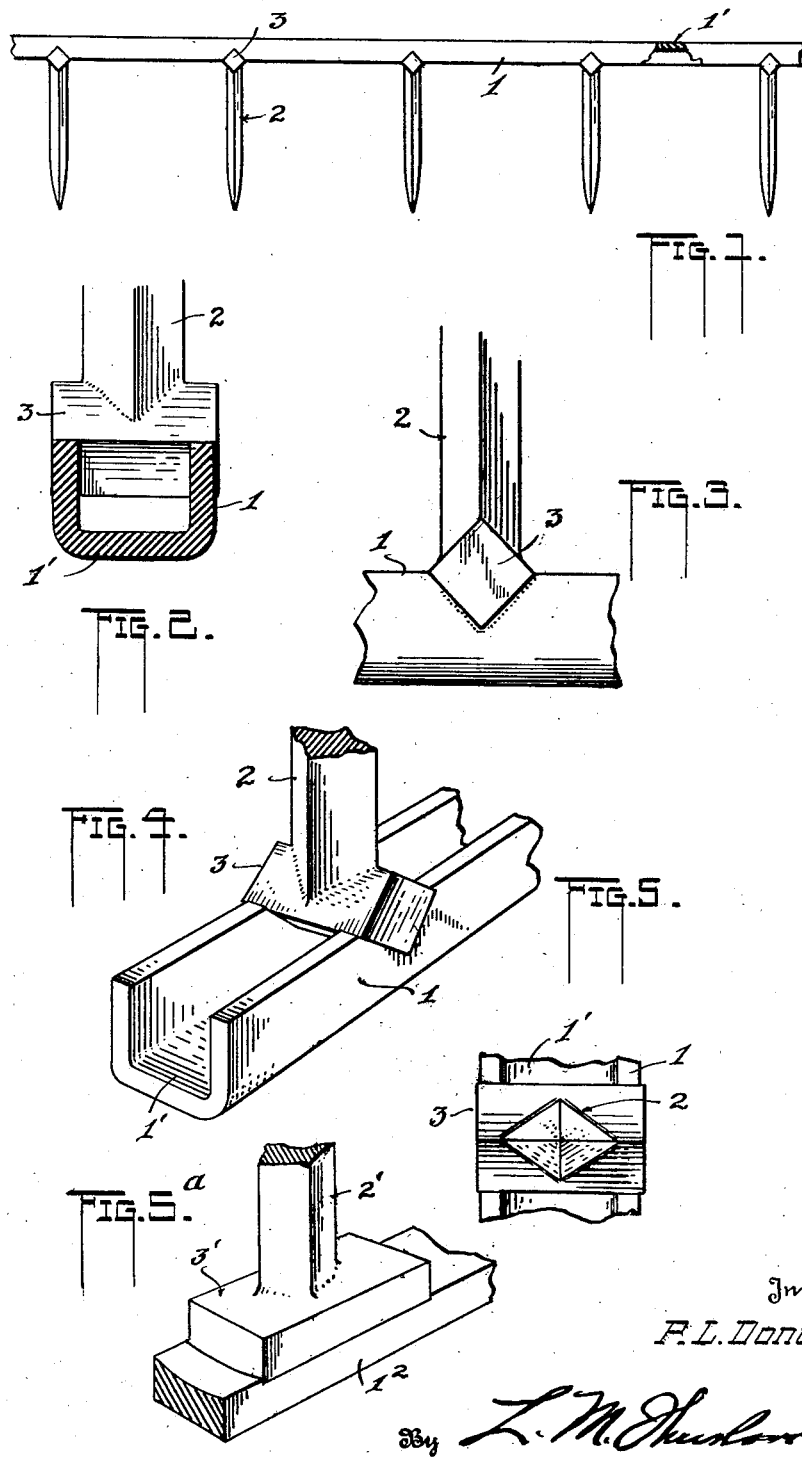

UNITED STATES PATENT OFFICE 2,208,835

HARROW TOOTH AND SUPPORTING BAR THEREFOR

Patrick L. Donovan, Peoria, Ill.

Application May 10, 1937, Serial No. 141,696
Renewed August 16, 1939

12 Claims. (Cl. 55—3)

This invention relates to a novel type of harrow tooth, and a new manner of securing a tooth to a harrow-tooth bar. Further, said invention pertains to a method of welding such novel type of harrow tooth to a harrow-tooth bar.

An object of the invention is to provide a harrow tooth with a cross-member at one end forming with said tooth a T and to secure it by said cross-member to a harrow-tooth bar preferably by electric welding operations to the end that an exceedingly strong unitary structure will result. Also, so provide a tooth and a tooth bar assembly that the whole will withstand exceedingly heavy strains, and wherein there will be no parts to become loosened, and in which there will be no projecting parts above or below the harrow bar.

As sometimes constructed the tooth of a harrow is secured in the tooth-bar by engaging a nut with a threaded stem portion of said tooth, said stem extending through a hole in the bar, said nut acting to clamp the tooth in position. Such methods tend to weaken the bar, the nuts become loose, and an inconvenient arrangement throughout is the result. And, in addition, in such a structure and even in other types of fastening means, parts extend both above and below the bar and thereby tend to accumulate trash which causes considerable annoyance.

The accompanying drawing illustrates my invention as an aid to the complete understanding of my invention.

Figure 1 is a side elevation of a harrow-tooth bar showing harrow teeth of my invention in place thereon.

Figure 2 is a transverse section of the tooth-bar of Figure 1, much enlarged, showing, in elevation, the head of a tooth in position thereon.

Figure 3 is a side elevation of part of the bar of Figure 2 and a portion of a tooth in position.

Figure 4 illustrates the tooth-bar and its tooth in perspective.

Figure 5 is a plan of a tooth and the transverse head thereof as seen in looking toward the pointed end of said tooth.

Figure 5ª illustrates in perspective a modified form of tooth and harrow-tooth-bar assembly.

In the several figures of the drawing 1 denotes a tooth carrying bar, preferably of channel form, and 2 is a tooth whose shaft portion is pointed at one end, in a customary way, Figure 1, its other end including a cross-member 3 preferably integral therewith forming with said tooth a T. The tooth may preferably be of a square or diamond shape as viewed endwise, Figure 5, and said head 3 may be of like form, or so formed, at least, that a part thereof is angular at that side or surface facing, said bar 1 substantially as shown in Figures 1, 3, and 4 so that one corner thereof which is let into the opposite limbs of said bar in this instance will lie near the yoke portion 1' of the bar, the head and the tooth-shank being preferably a single forged part.

The tooth 2 is attached to both limbs of the bar 1 by letting the head 3 cornerwise into said limbs preferably by the electric welding method using pressure in the operation, the metal of the head entering the said limbs and, through fusing, constituting a unitary structure.

Due to the channel form of the bar 1 it can be relatively light, the bridging of the head 3 across the limbs serving to create great strength and an extremely stable braced arrangement.

Since the forces while in use in the field are placed upon the tooth in a lateral direction with respect to the longitudinal line of the channel member it is clear that strains set up at the head 3 are transferred to opposite ends of said head in either direction of travel of the harrow. And since the ends are fixed at and within the widely spaced limbs of such channel member there is no likelihood of separation at the points of joining where a perfect weld exists, the tooth tending to bend under such strains rather than resulting in a distortion of the other parts of the structure. As a matter of preference, the head 3 while having the V-shaped lower side for welding into the channel member is extended in the direction of the tooth's point in order to add great strength where the tooth and said head meet. While the end section of the head is shown square it may be of other forms while retaining substantially a V-form at the welding side.

By welding the extremities of the head into opposite limbs of the bar 1 a firm anchorage is afforded for said head so that lateral strains on the tooth are withstood no matter how severe such strains may be. The bridging of the bar at intervals by the several heads also acts to strengthen said bar so that the whole structure is thus extremely rugged throughout.

In Figure 5ª a harrow-tooth bar of a different type is denoted at $1^2$ while the tooth and its head are identified by $2'$ and $3'$, respectively, the said head in the welding operation being naturally somewhat embedded in said bar $1^2$, although, of course, the form first described is preferable.

I claim:

1. A harrow tooth consisting of a shaft having a cross-member at one extremity of the shaft and extending from opposite sides of the shaft, part of said cross-member being in the form of a wedge whose apex edge would substantially intersect a prolongation of the longitudinal axis of said shaft.

2. A harrow tooth consisting of a shaft having at one extremity a cross-member integral with the shaft and extending from opposite sides of the shaft forming a T therewith, the side of said cross-member facing away from said shaft being of wedge shape whose apex edge would substantially intersect a prolongation of the longitudinal axis of said shaft.

3. The combination of a harrow-tooth bar and a harrow tooth mounted on, and substantially perpendicular to the longitudinal axis of, said bar, said tooth having a transverse head integral therewith and partially embedded in, and fixed relatively to, said bar.

4. The combination of a harrow-tooth bar and a harrow tooth mounted on, and substantially perpendicular to the longitudinal axis of, said bar, said tooth having a cross-head integral therewith and extended from opposite sides of said tooth in a transverse direction forming a T therewith, said head being partially embedded in, and fixed relatively to, said bar.

5. The combination of a harrow-tooth bar and a harrow tooth mounted on said bar substantially perpendicular to the longitudinal axis of the bar and including an integral cross-member at one end forming a head, constituting with said tooth a T, said head being directly welded to said harrow-tooth bar.

6. The combination of a harrow-tooth bar of channel form, and a harrow tooth attached thereto having a head integral therewith and extending from opposite sides thereof forming a T therewith, opposite ends of said head being partially embedded in the spaced flanges of said bar and secured in position therein.

7. The combination of a harrow-tooth bar of channel form, and a harrow tooth attached thereto having a head integral therewith extending from opposite sides thereof forming with said tooth a T, opposite ends of said head being partially embedded in the edges of the spaced flanges of said bar and welded in position therein.

8. The combination of a harrow-tooth bar, and a harrow tooth attached thereto having a cross-member at one end integral therewith and extending from opposite side surfaces of the tooth forming with the tooth a T, said head having a wedge form at that side thereof facing outwardly from said end of the tooth and whose apex edge also faces outwardly from that end, said head being partially embedded apex edge first in the bar and welded in position therein.

9. The combination of a harrow-tooth bar of channel form, and a harrow tooth having a head mounted in the channel side of said bar, said tooth and head being of substantially T form with said head comprising the cross-portion thereof, said head extending from side-flange to side-flange of said channel-bar and welded to both of said side-flanges.

10. The combination of a harrow-tooth bar having a pair of longitudinal flanges and a harrow tooth having a head mounted on said bar, said tooth and head being of substantially T form with said head comprising the cross-portion thereof, said head extending from one said flange of the bar to the other flange of the bar and welded to both of said flanges.

11. The combination of a harrow-tooth bar having a pair of longitudinal flanges and a harrow tooth having a head mounted on said bar, said tooth and head being of substantially T form with said head comprising the cross-portion thereof, the end portion of said head being embedded in, and welded to, both of said flanges.

12. The combination of a harrow-tooth bar having a pair of longitudinal flanges and a harrow tooth having a head mounted on said bar, said tooth and head being of substantially T form with said head comprising the cross-portion thereof, the end part of said head being of wedge-shape embedded in and welded to both of said flanges, said wedge portion being directed inwardly of said flanges.

PATRICK L. DONOVAN.